US010986299B2

(12) United States Patent
Verdant (10) Patent No.: US 10,986,299 B2
(45) Date of Patent: Apr. 20, 2021

(54) SENSOR FOR THE ACQUISITION OF AN OPTICAL SIGNAL MODULATED AT AN ACOUSTIC FREQUENCY

(71) Applicant: Commissariat à l'Energie Atomique et aux Energies Alternatives, Paris (FR)

(72) Inventor: Arnaud Verdant, Grenoble (FR)

(73) Assignee: Commissariat à l'Energie Atomique et aux Energies Alternatives, Paris (FR)

( * ) Notice: Subject to any disclaimer, the term of this patent is extended or adjusted under 35 U.S.C. 154(b) by 0 days.

(21) Appl. No.: 16/836,563

(22) Filed: Mar. 31, 2020

(65) Prior Publication Data

US 2020/0322561 A1    Oct. 8, 2020

(30) Foreign Application Priority Data

Apr. 2, 2019 (FR) ...................................... 1903526

(51) Int. Cl.
| | |
|---|---|
| *H04N 5/355* | (2011.01) |
| *H04N 5/3745* | (2011.01) |
| *G01N 21/17* | (2006.01) |
| *G01S 7/481* | (2006.01) |
| *H04N 5/378* | (2011.01) |

(52) U.S. Cl.
CPC ......... *H04N 5/378* (2013.01); *H04N 5/35536* (2013.01); *H04N 5/37455* (2013.01)

(58) Field of Classification Search
None
See application file for complete search history.

(56) References Cited

U.S. PATENT DOCUMENTS

| 4,754,259 A | 6/1988 | Joseph et al. | |
|---|---|---|---|
| 6,982,431 B2 * | 1/2006 | Modlin ................ | G01N 21/253 250/225 |

FOREIGN PATENT DOCUMENTS

WO    2012126838 A1    9/2012

OTHER PUBLICATIONS

Preliminary Search Report for French Application No. 1903526 dated Nov. 28, 2019, 2 pages.
Pitter, M.G. et al., "Phase-sensitive CMOS photo-circuit array for modulated thermoreflectance measurements," Electronics Letters, vo. 39, No. 18, Sep. 4, 2003, 2 pages.
Light, R.A. et al., "Highly parallel CMOS lock-in optical sensor array for hyperspectral recording in scanned imaging systems," Proceedings of SPIE, vol. 7570, Feb. 11, 2010, 11 pages.
(Continued)

*Primary Examiner* — Mark T Monk
(74) *Attorney, Agent, or Firm* — Moreno IP Law LLC (57) ABSTRACT

The present disclosure concerns a sensor for the acquisition of an optical signal modulated at an acoustic frequency, including a plurality of pixels, each including: a photodiode; an integration circuit configured to, at each period of the modulated optical signal, integrate a photocurrent delivered by the photodiode successively into K capacitors, K being an integer greater than or equal to 2; and a phase detection circuit configured to detect an order in the crossing of a predetermined voltage threshold by the K capacitors and to generate, according to the detected order, a signal representative of the phase of the modulated optical signal.

13 Claims, 6 Drawing Sheets

(56) References Cited

OTHER PUBLICATIONS

Buttgen, B. et al., "Robust Optical Time-of-Flight Range Imaging Based on Smart Pixel Structures," IEEE Transactions on Circuits and Systems, vol. 55, No. 6, Jul. 2008, pp. 1512-1525.
Wang, Y.M., et al., "Compact Ambient Light Cancellation Design and Optimization for 3D Time-of-Flight Image Sensors," Proc. Int. Image Sensor Workshop (IISW), Jun. 2013, 4 pages.

* cited by examiner

SENSOR FOR THE ACQUISITION OF AN OPTICAL SIGNAL MODULATED AT AN ACOUSTIC FREQUENCY

FIELD

The present disclosure concerns the field of acousto-optic imaging, particularly for medical applications. It more particularly aims at a sensor for the acquisition of an optical signal modulated at an acoustic frequency.

BACKGROUND

In a biological medium such as human or animal tissue, visible light propagates according to a scattering regime. In such a regime, the photons follow multiple optical paths, so that their relative arrangements are modified all along the propagation of light through the medium. It is then impossible, with a standard image sensor, to acquire a faithful image of the medium crossed by the light.

To trace back information of local absorption in the medium, so-called acousto-optic imaging techniques have already been provided, where the observed medium is illuminated by a coherent light beam, typically a laser beam, and a portion of the observed medium is submitted to an acoustic wave, typically an ultrasound acoustic wave. The vibration of the diffusers along the propagation path of the acoustic wave, also called acoustic marking area or also acoustic marking column, then modulates the phase of the scattered photons. At the output of the medium, one can find photons carrying the acoustic modulation, called marked photons, corresponding to the photons which have crossed the acoustic marking area, and photons which do not carry the acoustic modulation, called unmarked photons, corresponding to the photons which have not crossed the acoustic marking area. An interference between the light beam originating from the medium, called object beam, and a reference beam originating from the same light source but which has not crossed the scattering medium, is then caused. This enables to demodulate the object beam and to take the pulse of the marked photons down to the frequency of the acoustic wave. An image sensor is then used to measure the optical signal modulated at the acoustic frequency and to deduce therefrom information relative to the absorption of light in the marking area.

It would be desirable to have a sensor for the acquisition of an optical signal modulated at an acoustic frequency, this sensor overcoming all or part of the disadvantages of known sensors.

SUMMARY

To achieve this, an embodiment provides a sensor for the acquisition of an optical signal modulated at an acoustic frequency, comprising a plurality of pixels, each comprising:
a photodiode;
an integration circuit configured to, at each period of the modulated optical signal, integrate a photocurrent delivered by the photodiode successively into K capacitors, K being an integer greater than or equal to 2; and
a phase detection circuit configured to detect an order in the crossing of a predetermined voltage threshold by the K capacitors and to generate, according to the detected order, a signal representative of the phase of the modulated optical signal.

According to an embodiment, in each pixel, the phase detection circuit is capable of detecting the rank of the first one of the K capacitors to have crossed the voltage threshold and of assigning to the signal representative of the phase of the modulated optical signal one among K predetermined phase values according to the detected rank.

According to an embodiment, in each pixel, the phase detection circuit is capable of detecting the rank of the first P capacitors to have crossed the voltage threshold and the order of the crossing of the voltage threshold by said P first capacitors, P being an integer greater than or equal to 2 and smaller than K, and of assigning to the modulated optical signal one among $K^P$ predetermined phase values according to the detected ranks and order.

According to an embodiment, K=4.

According to an embodiment, each pixel further comprises a charge injection circuit controlled to, at the end of each period of the modulated optical signal during which at least one of the K capacitors crosses the voltage threshold, inject a same counter-charge into each of the K capacitors of the integration circuit.

According to an embodiment, in each pixel, at each modulation period, the photocurrent is successively integrated into the K capacitors in an order selected according to a binary signal representative of a phase jump sequence applied to a signal for modulating the optical signal.

According to an embodiment, each pixel comprises a phase control device capable of reemitting a portion of the modulated light beam received by the pixel, by introducing into the reemitted light beam a phase shift which is a function of the value of the signal representative of the phase of the modulated optical signal, generated by the pixel phase detection circuit.

According to an embodiment, in each pixel, the phase control device comprises a liquid crystal layer arranged between first and second electrodes.

According to an embodiment, in each pixel, the first electrode of the phase control device is connected to a node for delivering the signal representative of the phase of the modulated optical signal, generated by the pixel phase detection circuit.

According to an embodiment, in each pixel, the signal representative of the phase of the modulated optical signal is adapted, according to a calibration signal, by a compensation circuit.

According to an embodiment, each pixel comprises its own compensation circuit.

According to an embodiment, the sensor pixels are distributed into a plurality of sub-assemblies of neighboring pixels, a same compensation circuit being shared by all the pixels of a same sub-assembly and distinct compensation circuits being provided for distinct sub-assemblies.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF THE PRESENT EMBODIMENTS

Like features have been designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail. In particular, the imaging applications capable of being implemented based on the described sensors have not been detailed, the described embodiments being compatible with usual acousto-optic imaging applications in the medical field or in other fields.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following description, when reference is made to terms qualifying absolute positions, such as terms "front", "rear", "top", "bottom", "left", "right", etc., or relative positions, such as terms "above", "under", "upper", "lower", etc., or to terms qualifying directions, such as terms "horizontal", "vertical", etc., unless otherwise specified, it is referred to the orientation of the drawings, it being understood that, in practice, the described devices may be oriented differently.

Unless specified otherwise, the expressions "around", "approximately", "substantially" and "in the order of" signify within 10%, and preferably within 5%.

Figure 1:
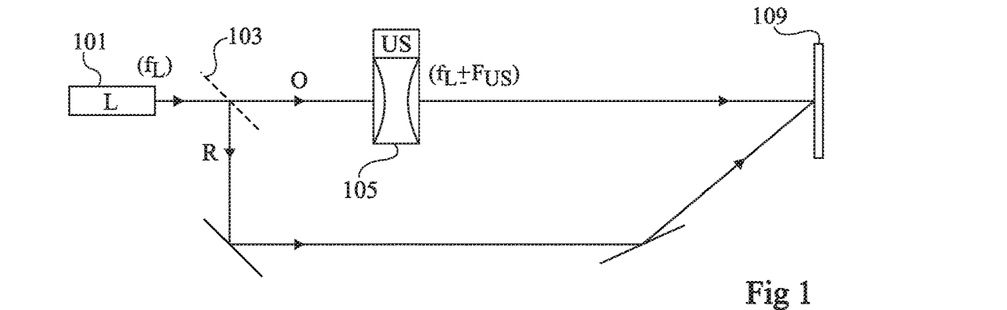
FIG. 1 schematically shows an example of an acousto-optic imaging system.

FIG. 1 schematically shows an example of an acousto-optic imaging system.

The system of FIG. 1 comprises a light source 101 (L) capable of generating a coherent light beam of frequency $f_L$, for example, a laser source. The system further comprises a separator 103, for example, a beam splitter 103 placed with a 45-degree angle with respect to the emission direction of source 101, enabling to divide the beam generated by source 101 into an object beam O and a reference beam R. The system is arranged so that object beam O illuminates an object or a sample 105 to be analyzed, and so that reference beam R does not cross object 105. The reference beam and the object beam reflected or transmitted by object 105 are then projected onto an image sensor 109 comprising an array of pixels (not detailed in FIG. 1), to generate an interference pattern in the acquisition plane of the sensor.

In the system of FIG. 1, a portion of object or sample 105 is excited by a sinusoidal acoustic wave of frequency $F_{US}$, for example, in the range from 1 to 15 MHz. As a result, the frequency of the rays of the object beam crossing the excited portion of the sample is shifted to value $f_L+F_{US}$ or $f_L-F_{US}$ while the frequency of the rays of the object beam crossing the non-excited portions of the sample remains at value $f_L$. Such a frequency shift enables to "mark" the photons of the object beam having crossed the excited portion of the sample, called marking area, with respect to the other photons of the object beam. It is then desired to measure the energy carried by the marked photons, to deduce therefrom information relative to light absorption in the marking area.

Figure 2:
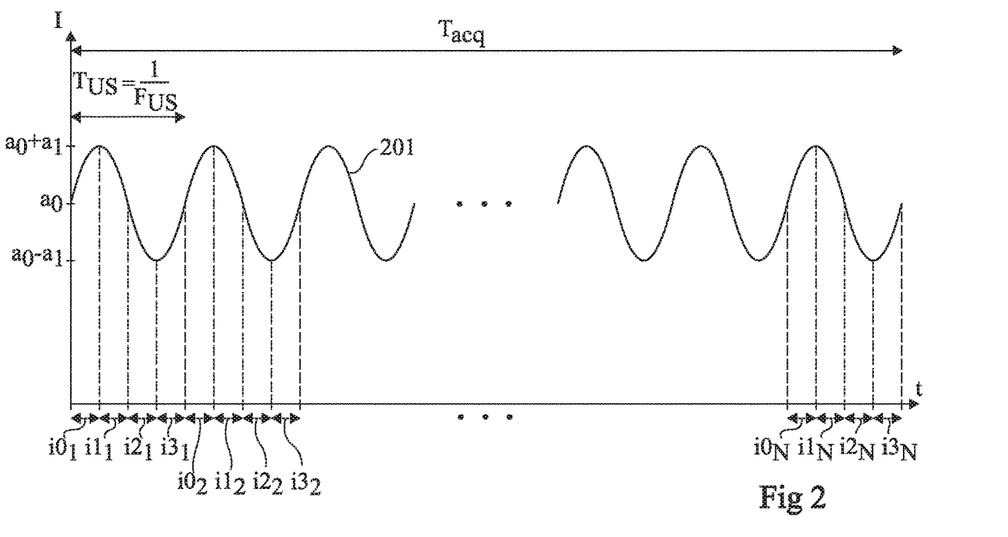
FIG. 2 is a diagram illustrating an example of operation of the system of FIG. 1.

FIG. 2 is a diagram illustrating in further detail the operating principle of the system of FIG. 1.

The diagram of FIG. 2 comprises a curve 201 showing the variation over time t (in abscissa) of the light intensity I (in ordinate) received by a pixel of sensor 109 of the system of FIG. 1, when sensor 109 is illuminated by the combination of the object beam and of the reference beam.

In operation, sensor 109 sees an interference pattern having a beat frequency equal to acoustic modulation frequency $F_{US}$. Thus, as shown in FIG. 2, the intensity I received by each pixel varies in sinusoidal fashion around an average value or DC component $a_0$, with a peak amplitude of value $a_1$, at a frequency equal to the acoustic modulation frequency $F_{US}$ of the system. The light intensities received by different pixels of sensor 109 may have different DC components $a_0$ and/or different amplitudes $a_1$, but all fluctuate in sinusoidal fashion at beat frequency $F_{US}$, with specific phase shifts.

Each pixel of sensor 109 comprises a photodiode delivering a current representative of the light intensity received by the pixel.

In this example, the measurement of the marked portion of the object beam is performed during an acquisition period $T_{acq}$ of duration $N*T_{US}$, where $T_{US}$ designates the period of acoustic modulation of the system, equal to $1/F_{US}$, and where N is an integer, greater than or equal to 1, for example, in the range from 100 to 10,000.

Each pixel comprises an integration circuit configured to, at each period of acoustic modulation $T_{US}$ of acquisition period $T_{acq}$, integrate the photocurrent delivered by the photodiode successively into K=4 different capacitors C0, C1, C2, and C3 (not shown in FIG. 2). Such a four-phase integration and sampling cycle is successively repeated N times during period $T_{acq}$, it being understood that the integration capacitors C0, C1, C2, and C3 of the pixel are not reset between the beginning and the end of period $T_{acq}$. The accumulation of the samples over a high number N of periods of the acoustic modulation signal enables to improve the signal-to-noise ratio of the measurement. Number N is preferably selected so that the duration of acquisition phase $T_{acq}$ remains shorter than a characteristic duration of decorrelation of the medium, for example, in the range from 0.1 to 5 ms, for example, in the order of 1 ms, corresponding to the time beyond which the amplitude and the phase of the measured signal risk varying due to physiological variations of the observed medium (for example, due to a blood platelet movement).

In FIG. 2, for each of the N periods $T_{US}$ of acquisition phase $T_{acq}$, references $i0_j$, $i1_j$, $i2_j$, and $i3_j$, designate the four successive periods of integration of the photocurrent delivered by the pixel photodiode, respectively in the four capacitors C0, C1, C2, and C3 of the pixel, where j is an integer in the range from 1 to N designating the rank of the considered acoustic modulation period $T_{US}$ in acquisition phase $T_{acq}$. In this example, integration periods $i0_j$, $i1_j$, $i2_j$, and $i3_j$ all substantially have the same duration, in the order of $T_{US}/4$.

At the end of acquisition phase $T_{acq}$, each pixel of the sensor delivers four values I0, I1, I2, and I3 respectively representative of the voltages across capacitors C0, C1, C2, and C3 of the pixel.

Based on these four values, the complex field $E_{OM}$ of the portion of the object beam marked by the acoustic modulation may be determined, for each pixel of the sensor, by formula $E_{OM}=(I0-I2)+j(I1-I3)$. Component I0-I2 corresponds to the real part of field $E_{OM}$, and component I1-I3 corresponds to the imaginary part of field $E_{OM}$. The phase $P_{OM}$ and the amplitude $A_{OM}$ of the marked object beam received by each pixel of the sensor may be determined by the following formulas:

$$P_{OM} = \arctan\left(\frac{I1-I3}{I0-I2}\right) \text{ and} \quad [\text{Eq. 1}]$$

$$A_{OM} = \sqrt{(I0-I2)^2 + (I1-I3)^2} \quad [\text{Eq. 2}]$$

Knowing the amplitude $A_{OM}$ of the marked object beam enables, in particular, to obtain information relative to the light absorption in the acoustic marking area, for example, to detect the possible presence of an absorbing body, for example, a tumor, in the marking area.

It should be noted that the acquisition technique described in relation with FIGS. 1 and 2 only enables to determine the average absorption within the marking area, but does not enable to obtain information relative to the absorption in local regions of the marking area.

To determine the absorption in local regions of the marking area, a solution comprises applying phase jumps to the acoustic marking wave, for example, according to a random or pseudo-random pattern. As an example, at each new acoustic modulation period $T_{US}$, a phase jump of value 0 or π, randomly or pseudo-randomly selected, is applied to the acoustic marking wave. At the level of sensor 109, after the interference of the object beam with the reference beam, the signal is sampled according to the four-phase demodulation method discussed in relation with FIG. 2, taking into account, during the demodulation, the phase jump pattern Φ applied to the acoustic marking wave.

Figure 3:
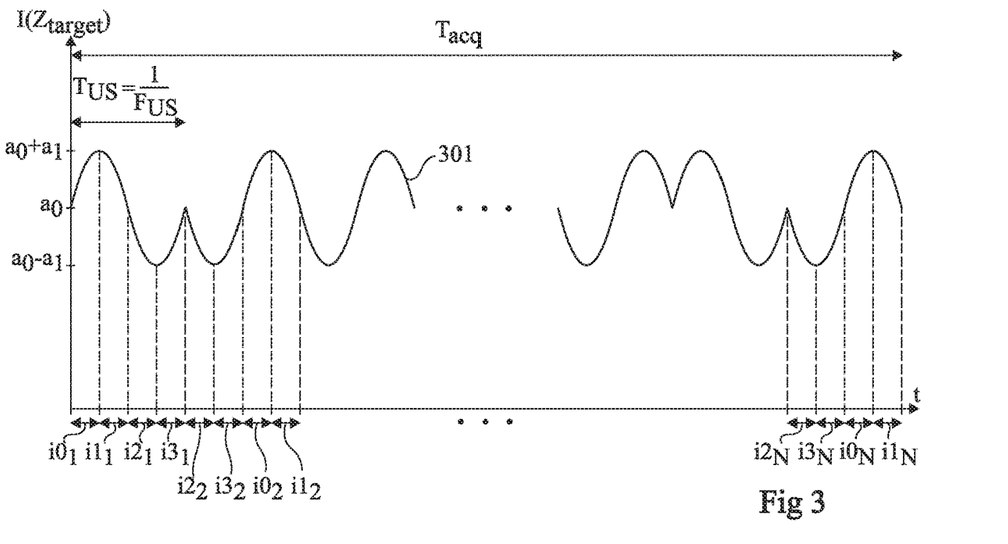
FIG. 3 is a diagram illustrating another example of operation of the system of FIG. 1.

FIG. 3 is a diagram illustrating this operating principle in further detail.

The diagram of FIG. 3 comprises a curve 301 representing the variation, over time t, in abscissa, of the contribution $I(Z_{target})$, in ordinate, of a local position $Z_{target}$ of the marking area, to the object optical signal received by sensor 109 after the interference with the reference signal.

Intensity $I(Z_{target})$ varies in sinusoidal fashion around an average value or DC component $a_0$, with a peak amplitude of value $a_1$, at a frequency equal to the acoustic modulation frequency $F_{US}$ of the system. However, in the example of FIG. 3, at each new period $T_{US}$ of acquisition phase $T_{acq}$, intensity $I(Z_{target})$ is submitted to a 0 or π phase jump corresponding to the phase jump pattern Φ applied to the acoustic marking wave, delayed by a delay $\Delta t=Z_{target}/V_{US}$, $V_{US}$ designating the propagation speed of the acoustic marking wave in the observed medium.

In each pixel of the sensor, the integration circuit is configured to, at each acoustic modulation period $T_{US}$ of acquisition period $T_{acq}$, integrate the photocurrent delivered by the photodiode successively into the four capacitors C0, C1, C2, and C3 (not shown in FIG. 3), taking into account the delayed phase jump pattern $\Phi d=\Phi(t-\Delta t)$ to determine the order in which capacitors C0, C1, C2, and C3 are connected to the photodiode. More particularly, in this example, for each acoustic modulation period $T_{US}$ of acquisition period $T_{acq}$, if the current phase shift value in the sequence of phase jumps Φd is zero, the photocurrent is successively integrated into capacitors C0, C1, C2, and C3 in the same order as at the previous period $T_{US}$. If, however, the current phase shift value in the sequence of phase jumps Φd is equal to π, the order of integration of the photocurrent into capacitors C0 and C2, on the one hand, and C1 and C3, on the other hand, is inverted.

At the end of acquisition phase $T_{acq}$, each pixel of the sensor delivers four values I0, I1, I2, and I3 respectively representative of the voltages across capacitors C0, C1, C2, and C3 of the pixel. Values I0, I1, I2, and I3 are mainly representative of the contribution to the object optical signal received by the pixel, of the position of the marking area for which phase jump pattern Φd is correlated to the acoustic modulation signal, that is, position $Z_{target}=V_{US}*\Delta t$.

Based on these four values, the complex field $E_{OM}$ of the portion of the object beam marked by the acoustic modulation at position $Z_{target}$ of the marking area may be determined, for each pixel of the sensor, by formula $E_{OM}=(I0-I2)+j(I1-I3)$. Component I0-I2 corresponds to the real part of field $E_{OM}$, and component I1-I3 corresponds to the imaginary part of field $E_{OM}$. The phase $P_{OM}$ and the amplitude $A_{OM}$ of the marked object beam received from position $Z_{target}$ may be determined by the same formulas Eq. 1 and Eq. 2 as in the example of FIG. 2.

The measurement may be repeated by modifying the delay $\Delta t$ between the phase jump sequence Φ applied to the acoustic modulation signal and the sequence Φd applied to the sensor, to measure the field $E_{OM}$ from another target position $Z_{target}$ in the marking area.

In the above-described examples, the average of the amplitudes $A_{OM}$ measured by the different sensor pixels enables to obtain information relative to the average absorption of the marking area (FIG. 2) or to the absorption of a local area of the marking area (FIG. 3).

In certain applications, it is further desirable to measure, in each pixel, the phase $P_{OM}$ of the portion of the object beam measured by the pixel.

As an example, each pixel may comprise a phase control device capable of remitting a portion of the light beam received by the pixel, with a phase shift selected according to the phase $P_{OM}$ of the incident beam. As an example, each pixel comprises a phase conjugation mirror capable of reflecting a portion of the incident beam towards the observed medium, with a phase shift $P_{OM}*=-P_{OM}$ corresponding to the conjugate of the phase $P_{OM}$ of the incident beam measured by the pixel. This enables to refocus a portion of the light received on the sensor at the level of the marking area. Such a refocusing of the object beam in the marking area may in particular enable to improve the signal-to-noise ratio of the measurement and/or to activate photosensitive molecules in the refocusing area and/or to destroy pathogenic cells by local heating of the medium.

Figure 4:
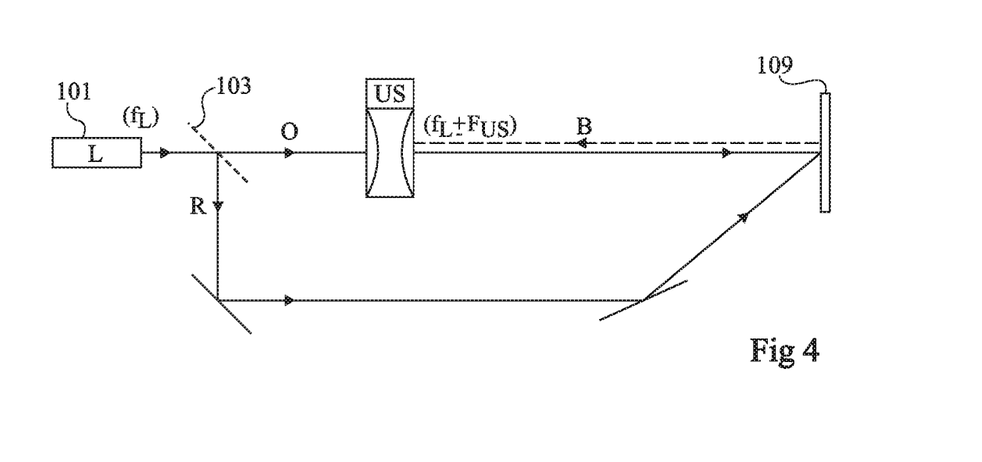
FIG. 4 schematically shows another example of an acousto-optic imaging system.

FIG. 4 schematically shows a variant of the acousto-optic imaging system of FIG. 1, where each pixel of the sensor comprises a phase control device capable of reflecting a portion of the light beam received by the pixel, with a phase shift controlled according to the value of the phase POM of the incident beam measured by the pixel.

In FIG. 4, the beam B reflected towards sample 105 and refocused by sensor 109 has been shown in dashed lines.

Figure 5:
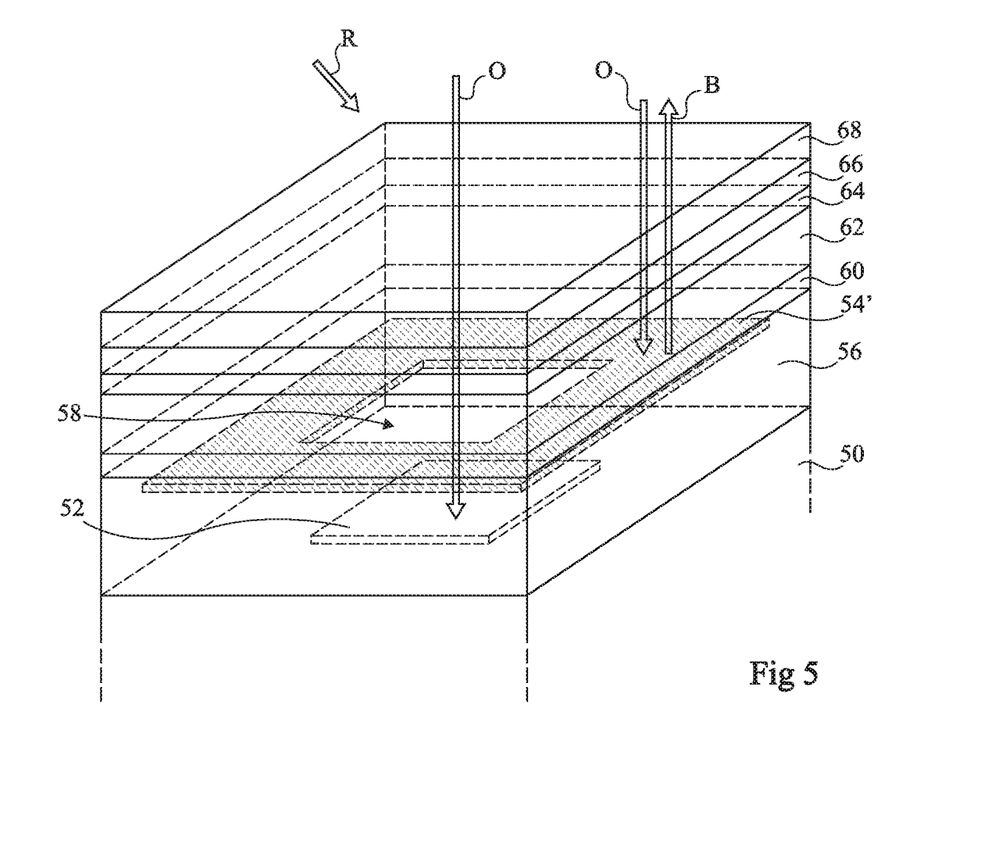
FIG. 5 is a perspective view schematically showing an embodiment of a pixel of a sensor of an acousto-optic imaging system.

FIG. 5 is a perspective view schematically showing an embodiment of a pixel of sensor 109 of FIG. 4.

The pixel of FIG. 5 comprises a semiconductor substrate 50 having a photodetection area 52, for example, a photodiode, defined in an upper portion thereof.

Substrate 50 is topped with a stack of metallization layers comprising conductive tracks 54 separated by an insulating material 56. For clarity, the conductive tracks of the first metallization levels are not shown in the perspective view of FIG. 5.

A conductive track 54', at least partly reflective at the emission wavelength of light source 101, which at least partly covers a portion of the pixel, is defined in an upper level of the interconnection stack. In the shown example, region 54' is made of an opaque material, for example, of the same material as the conductive tracks of the lower interconnection levels, for example, a metal such as aluminum or copper. An opening 58 is defined in region 54' opposite photodetection area 52. Thus, incident light beams which arrive at the level of opening 58 reach the surface of photodetection area 52, while incident light beams which arrive onto region 54' are reflected by said region. The relative surface areas of region 54' and of opening 58 are selected to reflect a desired proportion of the incident beam, for example, from 40 to 50% of the incident light flow of the incident beam.

A stack of a liquid crystal layer 62 and of a transparent conductive layer 66 is formed at the surface of the interconnection stack. In the shown example, the stack further comprises a first alignment layer 60 (bonding and alignment layer for liquid crystals) arranged between the upper surface of the interconnection stack and the lower surface of liquid crystal layer 62, and a second alignment layer 64 arranged between the upper surface of liquid crystal layer 62 and the lower surface of transparent conductive layer 66. The stack further comprises as an example an upper glass plate 68. Transparent conductive layer 66 forms a first electrode for controlling the liquid crystals of layer 62, while region 54' forms the second control electrode. Transparent conductive layer 66 is made of a conductive material transparent at the wavelength of light source 101. As an example, transparent conductive layer 66 may be made of indium tin oxide (ITO).

The elements of application of control voltages to electrodes 54' and 66 are not detailed herein, the forming of tracks and/or vias of access to electrodes such as electrodes 54' and 66 being well known in integrated circuit techniques.

The application of a voltage between electrodes 54' and 66 enables to modify the structure of the liquid crystals of layer 62, and thus the phase of the reflected light beam. It should be noted that such an adjustment is performed pixel by pixel, a counter-electrode 54' being independently defined in each of the pixels. The control voltage applied to liquid crystal layer 62, and thus the phase shift introduced by layer 62, are selected according to a measurement of the phase of the incident light beam detected by photodiode 52, said phase measurement being formed by a readout circuit internal to the pixel, not detailed in FIG. 5.

To measure the phase of the incident light beam within each pixel, a possibility is to apply the above-mentioned mathematical formula Eq. 1. However, the implementation of an arc tangent calculation requires relatively complex circuits, which are difficult to integrate within a pixel.

Thus, it is here desired to form a simple and compact pixel capable of delivering a signal representative of the phase of an optical signal modulated at an acoustic frequency.

Figure 6:
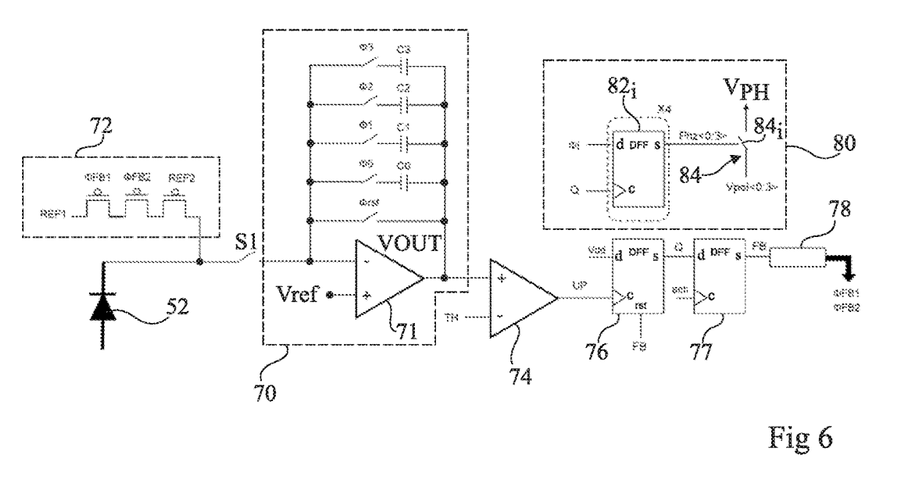
FIG. 6 is a simplified electric diagram of an embodiment of a pixel of a sensor of an acousto-optic imaging system.

FIG. 6 is a simplified electric diagram of an embodiment of a pixel of a sensor of an acousto-optic imaging system, for example, of the type described in relation with FIGS. 4 and 5. In practice, the sensor may comprise a plurality of identical or similar pixels, for example, arranged in an array of rows and columns.

The pixel of FIG. 6 is capable of implementing a four-phase demodulation of the type described in relation with FIGS. 2 and 3.

The pixel of FIG. 6 comprises a photodiode 52 capable of delivering a photocurrent according to a received light intensity.

The pixel of FIG. 6 further comprises an integration stage 70 configured to, at each period $T_{US}$ of phase $T_{acq}$ of acquisition of the modulated optical signal, integrate the photocurrent delivered by the photodiode successively into four different capacitors C0, C1, C2, and C3. The capacitors C0, C1, C2, and C3 of integration stage 70 for example have the same value.

In this example, the integration stage comprises an operational amplifier 71 having an inverting input (−) coupled to the cathode of photodiode 52 via a switch S1, and a non-inverting input (+) coupled to a node of application of a reference voltage $V_{ref}$, for example, a fixed DC voltage. Switch S1 has a first conduction node coupled, for example, connected, to the cathode of photodiode 52, and a second conduction node coupled, for example, connected, to the inverting input (−) of operational amplifier 71. It should be noted that in the rest of the disclosure, the switches of the described circuits and the signals for controlling such switches will be designated with the same reference numerals. For example, it will be spoken of signal S1 to designate the signal for controlling switch S1.

In the example of FIG. 6, integration stage 70 comprises four switches φ0, φ1, φ2, and φ3 series-coupled with capacitors C0, respectively C1, respectively C2, respectively C3, between the inverting input and the output of operational amplifier 71. More particularly, in the present example, each of capacitors C0, C1, C2, and C3 has a first electrode connected to the output node of operational amplifier 71 and a second electrode coupled to the inverting input of operational amplifier 71 via switch φ0, respectively φ1, respectively φ2, respectively φ3. Each of switches φ0, φ1, φ2, and φ3 has a first conduction node coupled, for example, connected, to the inverting input of operational amplifier 71, and a second conduction node coupled, preferably connected, respectively to the second electrode of capacitor C0, to the second electrode of capacitor C1, to the second electrode of capacitor C2, and to the second electrode of capacitor C3.

Integration stage 70 further comprises a reset switch φrst having a first conduction node coupled, for example, connected, to the inverting input of operational amplifier 71, and a second conduction node coupled, for example, connected, to the output of operational amplifier 71.

The pixel of FIG. 6 further comprises a charge injection circuit 72 controllable to inject a fixed predetermined quantity of compensation charges, called counter-charge, into each of capacitors C0, C1, C2, and C3 of integration stage 70. As an example, charge injection circuit 72 comprises three transistors MOS φFB1, φFB2, and REF2, for example, P-channel MOS transistors, series-coupled between a node of application of a reference voltage REF1 and the end of switch S1 opposite to the inverting input of operational amplifier 71. As an example, transistor φFB1 has a first conduction node connected to the node of application of voltage REF1 and a second conduction node connected to a first conduction node of transistor φFB1, and transistor REF2 has a first conduction node connected to switch S1 and a second conduction node connected to the second conduction node of transistor φFB2. For simplification, MOS transistors φFB1, φFB2, and REF2 and the gate control signals of the transistors are here designated with the same references. Signals REF1 and REF2 are for example fixed DC bias voltages, signals φFB1 and φFB2 being control voltages of transistors φFB1 and φFB2, each of voltages φFB1 and φFB2 having a low level and a high level defining a two-level potential barrier, it being understood that the low, respectively high, level, of voltage φFB1 may be different from the low, respectively high, level, of voltage φFB2.

The pixel of FIG. 6 further comprises a voltage comparator 74 having a positive input (+) coupled, for example, connected, to an output node of integration stage 70. More particularly, in this example, the positive input (+) of voltage comparator 74 is coupled, for example, connected, to the output node of the operational amplifier 71 of integration stage 70. Comparator 74 further has a negative input (−) coupled, for example, connected, to a node of application of a threshold voltage TH, for example, a fixed DC voltage. Comparator 74 has an output node delivering a signal UP, for example, a voltage, having a first state, for example, a low state, when the output voltage VOUT of integration stage 70 is smaller than voltage TH, and a second state, for example, a high state, when the output voltage VOUT of integration stage 70 is greater than threshold TH.

The pixel of FIG. 6 further comprises a first D flip-flop (DFF) 76 having a d data input node coupled, for example, connected, to a node of application of a fixed DC reference voltage Vdd, for example corresponding to a high power supply voltage of the pixel and seen as a high logic state by flip-flop 76, and a c control input node coupled, for example, connected, to the output node of comparator 74. Flip-flop 76 further comprises a reset input node rst. Flip-flop 76 further comprises an s output node delivering a Q binary data signal representative of the high or low binary value stored in flip-flop 76.

The pixel of FIG. 6 further comprises a second D flip-flop 77 having a d data input node coupled, for example, connected, to the s output of flip-flop 76 and a c control input node coupled, for example, connected, to a node of application of a sampling signal ech. Flip-flop 77 further comprises an s output node delivering a signal FB representative of the high or low binary value stored in flip-flop 77. The output signal FB of flip-flop 77 is applied to the reset input node rst of flip-flop 76, for example, by direct connection of the s output node of flip-flop 77 to the reset input node rst of flip-flop 76.

The pixel of FIG. 6 further comprises, at the output of flip-flop 77, a logic circuit 78 generating control signals φFB1 and φFB2 of charge injection circuit 72 according to the state of the binary output signal FB of flip-flop 77.

The pixel of FIG. 6 further comprises a phase detection circuit 80 capable of generating a signal $V_{PH}$, for example, a voltage, representative of the phase of the modulated optical signal received by photodiode 52. As an example, signal $V_{PH}$ is representative of the phase shift to be applied to the reflected signal, which depends on the phase of the modulated optical signal received by photodiode 52. In the example of FIG. 6, phase detection circuit 80 comprises four D flip-flops $82_i$, being an integer in the range from 0 to 3. Each of flip-flops $82_i$ has a d data input node receiving the signal φi for controlling the switch φi of same rank i of integration stage 70. As an example, each flip-flop $82_i$ has its d data input node connected to the control node of the switch φi of same rank i. Each of flip-flops $82_i$ further has a c control node receiving the Q output signal of flip-flop 76. As an example, each flip-flop $82_i$ has its c input node connected to the output node of flip-flop 76. Each flip-flop $82_i$ further comprises an s output node delivering a binary data signal Phz<i> representative of the high or low binary value stored in the flip-flop. The signal Phz<0:3> formed by the four output bits of flip-flops $82_i$ is used to control a four-path-one-path switch 84 of phase detection circuit 80. In this example, switch 84 is configured to apply to the node for supplying phase signal $V_{PH}$ one among four predetermined bias voltages Vpol<0>, Vpol<1>, Vpol<2>, and Vpol<3>, for example, fixed or variable voltages having distinct levels, according to the state of signal Phz<0:3>. More particularly, in this example, switch 84 comprises four switches $84_i$, each having a first conduction node coupled, for example, connected, to a node of application of the bias voltage Vpol<i> of same rank i, a second conduction node coupled, for example, connected, to the node for supplying voltage $V_{PH}$, and a control node coupled, for example, connected, to the s output node of the flip-flop $82_i$ of same rank i. In this example, the output signals of flip-flops $82_i$ are mutually exclusive, that is, at a given time, only one of switches $84_i$ may be on (in other words, two switches $84_i$ cannot be simultaneously on). Thus, the output voltage $V_{PH}$ of phase detection circuit 80 can only take one of the four voltage values Vpol<0>, Vpol<1>, Vpol<2>, and Vpol<3>, according to the state of signal Phz<0:3>. As an example, in a pixel structure of the type described in relation with FIG. 5B, voltage $V_{PH}$ may be directly used to control the liquid crystal layer 62 of the pixel. In this case, the node for delivering output voltage $V_{PH}$ may be connected to the bias electrode 54' of the pixel.

The operation of the pixel of FIG. 6 will now be described in further detail in relation with FIGS. 7 and 8.

Figure 7:
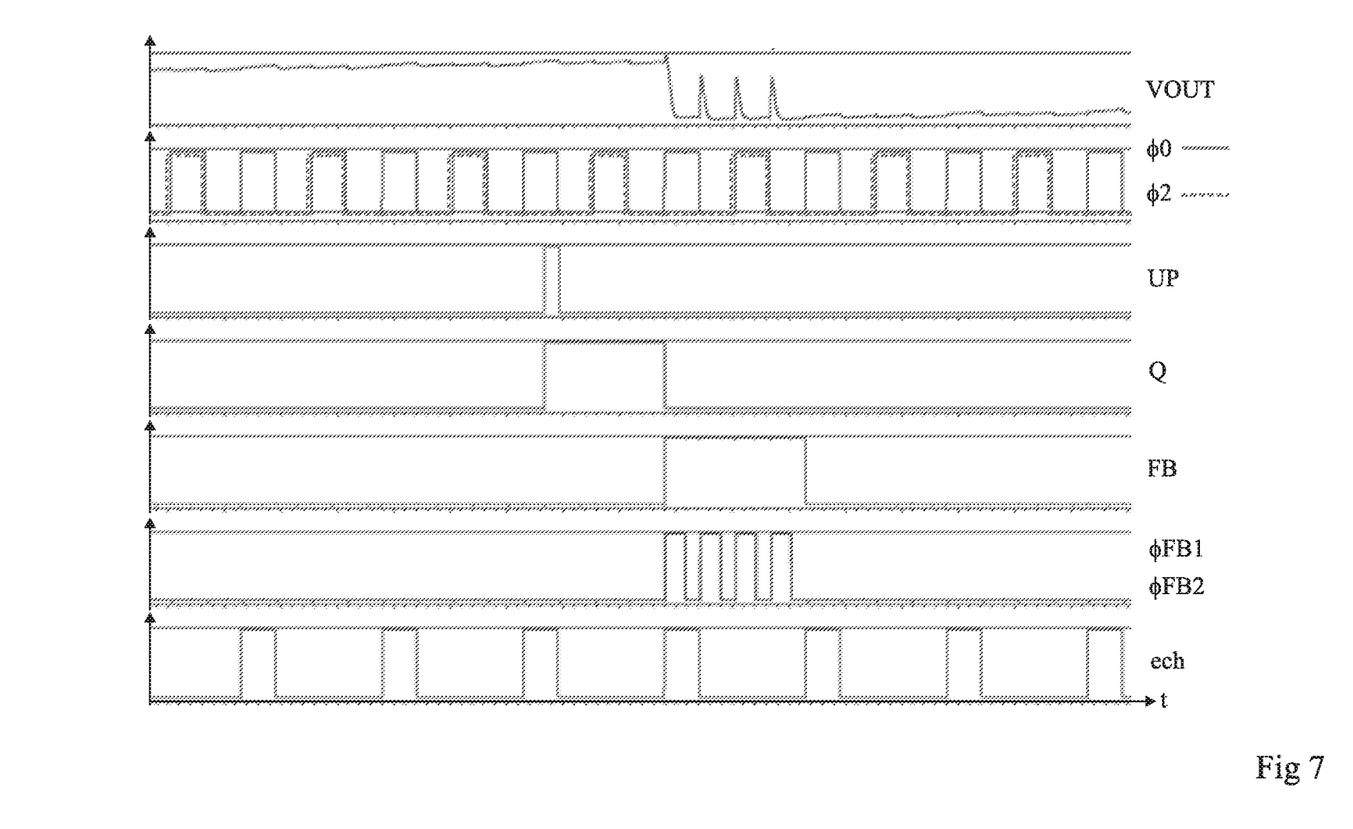
FIG. 7 is a diagram illustrating the operation of the pixel of FIG. 6.
Figure 8:
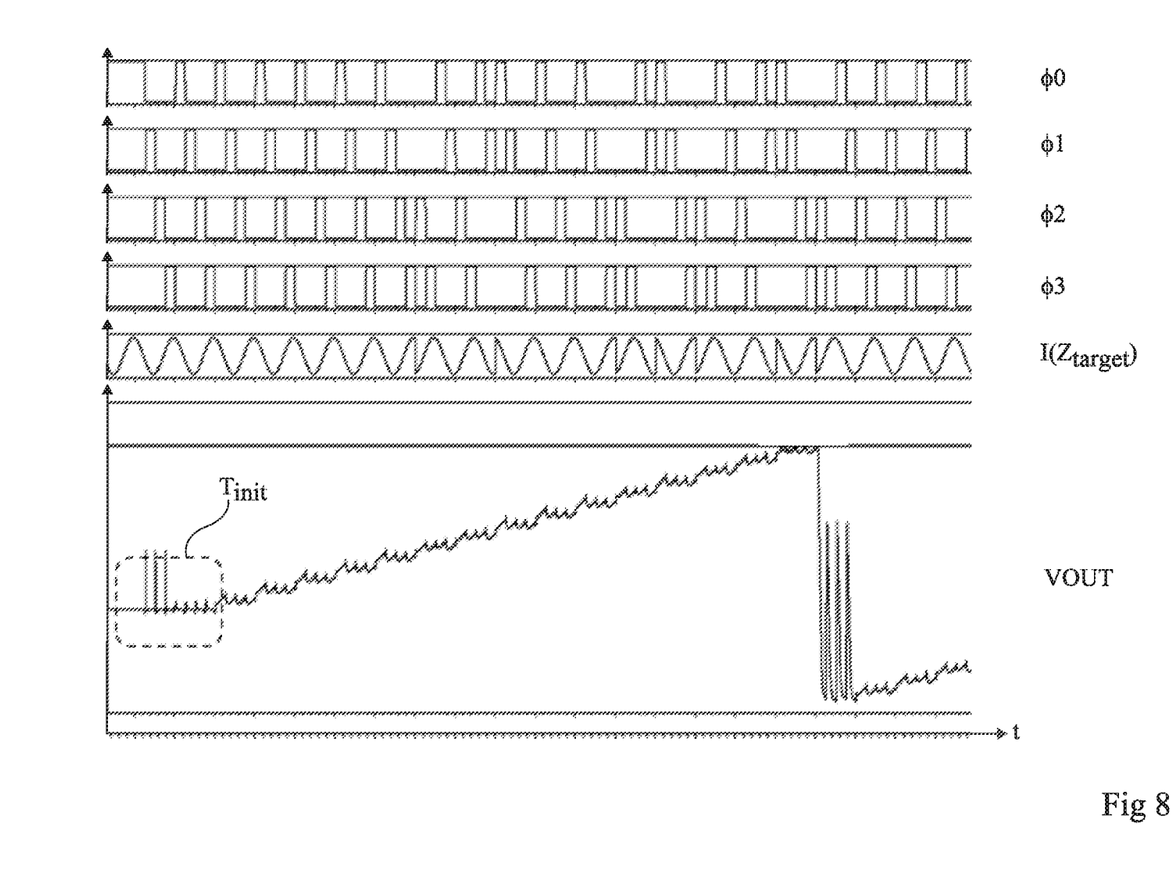
FIG. 8 is another diagram illustrating the operation of the pixel of FIG. 6.

FIGS. 7 and 8 are diagrams illustrating the time variation of various internal signals and/or signals for controlling the pixel of FIG. 6 during a phase of measurement of an optical signal modulated at an acoustic frequency, for example, a signal of the type previously described in relation with FIG. 2 (optical signal modulated at an acoustic frequency with no random phase jumps) or in relation with FIG. 3 (optical signal modulated at an acoustic frequency with random phase jumps).

FIG. 7 more particularly shows the variation, over time t (in abscissa), of the output voltage VOUT of integration circuit 70, of the control voltages φ0 and φ2 of switches φ0 and φ2 of integration circuit 70, of the output voltage UP of comparator 74, of the Q output voltage of flip-flop 76, of the output voltage FB of flip-flop 77, of the control voltages φFB1 and φFB2 of charge injection circuit 72, and of the control voltage ech of flip-flop 77.

For simplification, the control voltages φ1 and φ3 of switches φ1 and φ3 of integration circuit 70 have not been shown in FIG. 7.

FIG. 7 shows an operation in demodulation mode with no phase jump, for example, to measure a modulated optical signal of the type described in relation with FIG. 2.

FIG. 8 shows the variation, over time t (in abscissa), of the output voltage VOUT of integration circuit 70, and of the control voltages φ0, φ1, φ2, and φ3 of switches φ0, φ1, φ2, and φ3 of integration circuit 70. FIG. 8 further shows the time variation of the light intensity ($Z_{target}$) which is desired to be measured.

FIG. 8 shows a demodulation operation with random phase jumps, for example, to measure a modulated optical signal of the type described in relation with FIG. 3.

During the entire optical signal measurement phase, switch S1 of the pixel is maintained on (conductive). At the beginning of the measurement phase, the voltages across the capacitors C0, C1, C2, and C3 of integration stage 70 are all taken down to zero by the simultaneous turning on of switches ϕ0, ϕ1, ϕ2, ϕ3, and ϕrst, during an initialization phase $T_{init}$ (FIG. 8). At the end of initialization phase $T_{init}$, the actual phase of acquisition of the modulated optical signal (phase $T_{acq}$ of FIGS. 2 and 3) starts.

All along acquisition phase $T_{acq}$, the photonic current generated by the photodiode is sequentially integrated into capacitors C0, C1, C2, and C3, according to the four-phase demodulation method described in relation with FIG. 2 or 3. For this purpose, in the example of FIG. 7, for each acoustic modulation period $T_{US}$ of phase $T_{acq}$, control signals ϕ0, ϕ1, ϕ2, and ϕ3 are successively set to the high state (corresponding to a state where switches ϕ0, ϕ1, ϕ2, and ϕ3 are controlled to the on state), in this order during a period in the order of $T_{US}/4$. Signals ϕ0, ϕ1, ϕ2, and ϕ3 are non-overlapping so that, during the entire acquisition phase $T_{acq}$, two of switches ϕ0, ϕ1, ϕ2, and ϕ3 are never simultaneously on. In the example of FIG. 8, for each modulation period $T_{US}$ of phase $T_{acq}$, control signals ϕ0, ϕ1, ϕ2, and ϕ3 are successively set to the high state in an order selected according to the current phase value of the delayed phase jump pattern Φd used for the demodulation. The delayed phase jump pattern Φd applied during the acquisition phase may be common to all the sensor pixels, and the switching order of switches ϕ0, ϕ1, ϕ2, and ϕ3 may be determined in common fashion for all the sensor pixels.

In practice, the object light beam received by each pixel comprises photons marked by the acoustic modulation and photons non-marked by the acoustic modulation. The optical signal received by the photodiode thus comprises the sinusoidal component of frequency $F_{US}$, corresponding to the marked photons, but also an offset. The optical energy associated with this offset may be much higher, for example, more than 100 times higher, than the energy of the marked portion of the beam.

Thus, the voltages across capacitors C0, C1, C2, and C3 progressively increase for each new acoustic modulation period $T_{US}$ of acquisition phase $T_{acq}$. The integration of the photonic current into the four capacitors C0, C1, C2, and C3 of integration circuit 70 may then result in a very fast saturation of the pixel with, in the end, a very low quantity of collected useful signal (low signal-to-noise ratio).

Comparator 74, flip-flops 76 and 77, and charge injection circuit 72 form an offset compensation circuit. Comparator 74 enables to detect the crossing of a predetermined voltage threshold TH, for example, in the order of 2 volts, by one of capacitors C0, C1, C2, and C3 during a phase of integration of the photocurrent in the capacitor. As soon as threshold TH has been crossed by one of capacitors C0, C1, C2, and C3, the output signal UP of comparator 74 switches to the high state, which immediately causes the switching to the high state of the Q output signal of flip-flop 76 (previously initialized to the low state).

Signal ech for controlling flip-flop 77 is a periodic square pulse signal of frequency $F_{US}$ having a rising edge at the beginning of each period $T_{US}$ of acquisition phase $T_{acq}$. Thus, the output signal FB of flip-flop 77 switches to the high state at the beginning of the acoustic modulation period $T_{US}$ following the period $T_{US}$ having led to the crossing of threshold TH by one of capacitors C0, C1, C2, and C3. Signal FB being applied to the reset node of flip-flop 76, this leads to resetting flip-flop 76. The Q signal then switches back to the low state.

During the period $T_{US}$ following the switching to the high state of signal FB, logic circuit 78 controls charge injection circuit 72 (via signals ϕFB1 and ϕFB2) and integration circuit 70 (via signals ϕ0, ϕ1, ϕ2, and ϕ3) to inject into each of the capacitors C0, C1, C2, and C3 of the integration circuit a same counter-charge Δq, of predetermined value. For this purpose, control signals ϕ0, ϕ1, ϕ2, and ϕ3 are, as previously described, successively controlled to the on state for a period in the order of $T_{US}/4$. At each of the four conduction periods of a switch ϕi, voltages ϕFB1 and ϕFB2, initially in their respective low states, are successively set to their respective high states with an interval of a few nanoseconds (for example, with an interval in the range from 1 to 20 ns), starting with voltage ϕFB1, and then maintained in their respective high levels during a first part of the conduction period of switch ϕi, for example, during the first part of the conduction period of switch ϕi. The setting to the high state of voltage ϕFB1 acts as a potential barrier for the counter-charge Δq stored in the channel of transistor ϕFB2 so that, at the switching of voltage ϕFB2 to its high level, the charges of counter-charge Δq cross potential barrier REF2 (with REF2>Vref), and migrate towards the capacitor Ci connected to switch ϕi. Voltages ϕFB1 and then ϕFB2 are then switched to their respective low levels and then maintained in their respective low levels during the second part of the conduction period of switch ϕi, to precharge again the channel region of transistor ϕFB2 for the injection of the next counter-charge Δq.

Thus, a common contribution which may be seen, in average, as a current for compensating the offset photonic current is added to each of the four output samples I0, I1, I2, and I3 of the pixel. At the end of acquisition phase $T_{acq}$, each of samples I0, I1, I2, and I3 will carry the previously-described integration of the N phases $i0_j$, respectively $i1_j$, respectively $i2_j$, respectively $i3_j$, as well as of a common residual offset. The residual offset will be taken down to zero on calculation of the real and imaginary portions of the object signal, by differentiation of samples I0-I2 and I1-I3.

During acquisition phase $T_{acq}$, the offset being common to all samples I0, I1, I2, and I3, the order in which threshold TH is crossed by the samples provides information relative to the relative magnitudes of the energies carried by the photocurrent in each of integration periods $i0_j$, $i1_j$, $i2_j$, and $i3_j$. Thus, knowing the rank of the sample having crossed the threshold first, the phase of the modulated optical signal measured by the pixel can be traced back.

In practice, during a same acoustic modulation period $T_{US}$ of acquisition phase $T_{acq}$, threshold TH may be crossed by a plurality of capacitors C0, C1, C2, and C3 of the pixel. In this case, with the above-described operation, it is not possible, at the end of modulation period $T_{US}$, to know which of samples I0, I1, I2, and I3 has the highest value. In the pixel of FIG. 6, the four flip-flops $82_i$ have, as a sampling signal or control signal, the Q signal. This signal being only reset after application of counter-charge Δq, if two samples or more were to cross the threshold before the activation of signal FB, only the first signal ϕi in the high state upon crossing of threshold TH will be taken into account. Such an assembly guarantees that only one of the switches $84_i$ is on at the same time, signals ϕi being non-overlapping. For the above-described object beam refocusing application, given the low quantization resolution required on the phase for the refocusing operation, the error introduced by the selection of the first sample crossing threshold TH can be considered as tolerable. It should further be noted that during the successive modulation periods $T_{US}$ of acquisition phase $T_{acq}$, since the interval between the values of samples I0, I1, I2, and I3 increases, the determination of the phase value will be more and more accurate. The determination on the fly of the phase value during acquisition phase $T_{acq}$ has the advantage, in the above-mentioned application to the refocusing of the object beam, to enable to start polarizing the liquid crystal layer without waiting for the end of the measurement. The possible readjustment of the phase value during the acquisition due to the increase in the difference between the values of the different samples will be all the faster (in terms of physical realignment of the liquid crystal molecules) as the phase estimation has a high probability of being increasingly stable during the acquisition, with potential variations of the estimated phase which only appear between neighboring quadrants, and thus increasingly small liquid crystal polarization jumps (in the example of application of FIGS. 4 and 5).

In the example of FIG. 6, the pixel performs a quantization of the phase over two bits only, which is sufficient for the above-described object beam refocusing application. As an example, the value of the phase of the modulated light beam may be considered as being equal to:

0 when signal Phz<0:3> is '1000';
3π/2 when signal Phz<0:3> is '0100';
π when signal Phz<0:3> is '0010'; and
π/2 when signal Phz<0:3> is '0001'.

To obtain a phase measurement quantized over more than two bits, a possibility is to search for the first two samples having crossed threshold TH are, and for the order in which it has been crossed. Such a search may be carried out over a plurality of successive modulation periods $T_{US}$. The search for the rank of the second sample having crossed threshold TH should be performed before the application of counter-charge φq in capacitors C0, C1, C2, and C3. The sizing of integrator 70 and of threshold TH may then be selected to enable to carry on with no saturation the integration of the first sample to have crossed the threshold until the second sample crosses the threshold.

Figure 9:
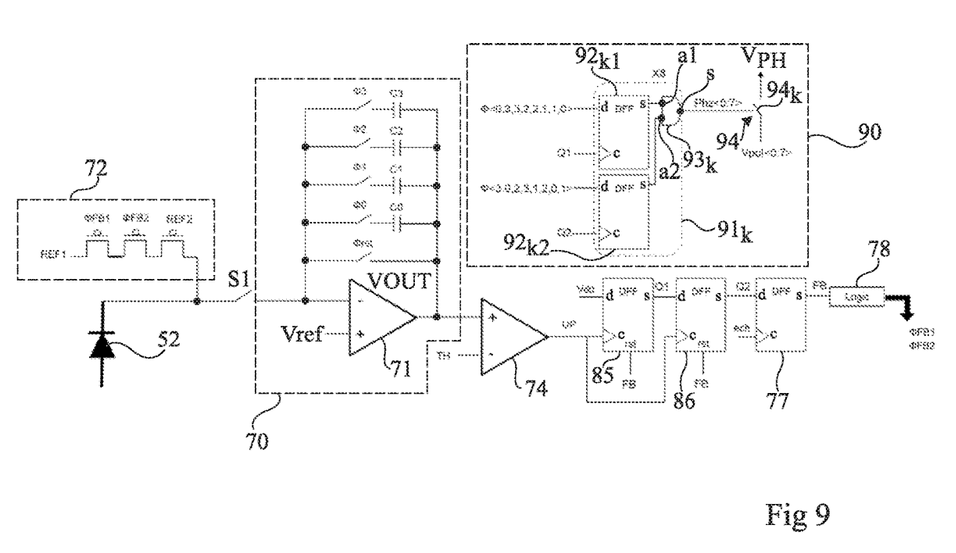
FIG. 9 is a simplified electric diagram of another embodiment of a pixel of a sensor of an acousto-optic imaging system.

FIG. 9 is a simplified electric diagram illustrating a variant of the pixel of FIG. 6, capable of enabling to search for the first two samples having crossed threshold TH, in order to deliver a phase value quantized over three bits (eight possible phase values).

The pixel of FIG. 9 differs from the pixel of FIG. 6 in that, in the pixel of FIG. 9, the D flip-flop 76 of the pixel of FIG. 6 is replaced with an association of two series-cascaded D flip-flops 85 and 86 sharing the same sampling signal UP.

Flip-flop 85 has a d data input node coupled, for example, connected, to node Vdd, and a c control input node coupled, for example, connected, to the output node of comparator 74. Flip-flop 85 further comprises an s output node delivering a binary data signal Q1. Flip-flop 86 has a d data input node coupled, for example, connected, to the s output node of flip-flop 85, and a c control node coupled, for example, connected, to the output node of comparator 74. Flip-flop 86 further comprises an s output node delivering a binary data signal Q2. The s output node of flip-flop 86 is coupled, for example, connected, to the d data input node of flip-flop 77. Each of flip-flops 85 and 86 further comprises a reset node rst coupled, for example, connected, to the s output node of flip-flop 77.

The pixel of FIG. 9 further differs from the pixel of FIG. 6 in that, in the pixel of FIG. 9, the phase detection circuit 80 of the pixel of FIG. 6 is replaced with a phase detection circuit 90.

Phase detection circuit 90 is capable of generating a signal $V_{PH}$ representative of the phase of the modulated optical signal received by photodiode 52. In the example of FIG. 9, phase detection circuit 90 comprises eight detection sub-circuits $91_k$, k being an integer in the range from 0 to 7. Each detection sub-circuit $91_k$ comprises two D flip-flops $92_{k1}$ and $92_{k2}$, and an AND gate $93_k$ having two inputs a1 and a2 and one output s. Each of the eight flip-flops $92_{k1}$ comprises a d input node receiving one of the four control signals φ0, φ1, φ2, and φ3, and a c control node receiving output the output signal Q1 of flip-flop 85. Each of the eight flip-flops $92_{k2}$ comprises a d input node receiving one of the four control signals φ0, φ1, φ2, and φ3, and a c control node receiving the output signal Q2 of flip-flop 85. The connections of signals φ0, φ1, φ2, and φ3 to the input nodes of the 16 flip-flops $92_{k1}$ and $92_{k2}$ are such that the 8 detection sub-circuits $91_k$ respectively receive on the d input nodes of their flip-flops $92_{k1}$ and $92_{k2}$ the eight possible combinations of orders of the crossing of threshold TH by two of samples I0, I1, I2, and I3. More particularly, in the present example:

flip-flops $92_{01}$ and $92_{02}$ receive on their d nodes respectively signals φ0 and φ1;
flip-flops $92_{11}$ and $92_{12}$ receive on their d nodes respectively signals φ1 and φ0;
flip-flops $92_{21}$ and $92_{22}$ receive on their d nodes respectively signals φ1 and φ2;
flip-flops $92_{31}$ and $92_{32}$ receive on their d nodes respectively signals φ2 and φ1;
flip-flops $92_{41}$ and $92_{42}$ receive on their d nodes respectively signals φ2 and φ3;
flip-flops $92_{51}$ and $92_{52}$ receive on their d nodes respectively signals φ3 and φ2;
flip-flops $92_{61}$ and $92_{62}$ receive on their d nodes respectively signals φ3 and φ0; and
flip-flops $92_{71}$ and $92_{72}$ receive on their d nodes respectively signals φ0 and φ3.

In each detection sub-circuit $91_k$, flip-flop $92_{k1}$ has an s output node coupled, for example, connected, to input node a1 of AND gate $93_k$ and flip-flop $92_{k2}$ has an s output node coupled, for example, connected, to input node a2 of AND gate $93_k$.

In each of phase detection sub-circuits $91_k$, the s output node of AND gate $93_k$ delivers a binary data signal Phz<k> representative of the logic combination by AND gate $93_k$ of the binary values stored in flip-flops $92_{k1}$ and $92_{k2}$. The signal Phz<0:7> formed by the eight output bits of AND gates $93_k$ is used to control an eight-path-to-one-path switch 94 of phase detection circuit 90. In this example, switch 94 is configured to apply to the node for supplying phase signal $V_{PH}$ one among eight predetermined bias voltages Vpol<0>, Vpol<1>, Vpol<2>, Vpol<3>, Vpol<4>, Vpol<5>, Vpol<6>, and Vpol<7>, for example, fixed or variable voltages having distinct levels, according to the state of signal Phz<0:7>. More particularly, in the present example, switch 94 comprises eight switches $94_k$ each having a first conduction node coupled, for example, connected, to a node of application of the bias voltage Vpol<k> of same rank k, a second conduction node coupled, for example, connected, to the node for delivering voltage $V_{PH}$, and a control node coupled, for example, connected, to the s output node of the AND gate $93_k$ of same rank k. In the present example, the output signals of AND gates $93_k$ are mutually exclusive, that is, at a given time, only one of switches $94_k$ may be turned on. Thus, the output voltage $V_{PH}$ of phase detection circuit 90 can only take one of the eight voltage values Vpol<0>, Vpol<1>, Vpol<2>, Vpol<3>, Vpol<4>, Vpol<5>, Vpol<6>, and Vpol<7>, according to the state of signal Phz<0:7>.

In the pixel of FIG. 9, signal Q1 switches to the high state after the crossing of threshold TH by a first sample, and signal Q2 switches to the high state after the crossing of threshold TH by a second sample. Feedback signal FB is then activated after the sampling of the high state of signal Q2 by signal ech, in flip-flop 77. Signals Q1 and Q2 enable to sample in parallel eight pairs of control signals (φ0, φ3), (φ3, φ0), (φ3, φ2), (φ2, φ3), (φ2, φ1), (φ1, φ2), (φ1, φ0), and (φ0, φ1) in the eight detection sub-circuits $91_k$. At the end of the sampling, only the sub-circuit $91_k$ having sampled two control signals in the high state on the rising edges of signals Q1 and Q2 will deliver an output signal in the high state, enabling to select a corresponding value of voltage $V_{PH}$.

In the example of FIG. 9, the pixel performs a phase quantization over three bits. As an example, the value of the phase of the modulated light beam is considered as being equal to:

0 when signal Phz<0:7> is '10000000' (crossing of threshold TH first by sample I0 and then by sample I3);

π/4 when signal Phz<0:7> is '01000000' (crossing of threshold TH first by sample I3 and then by sample I0);

π/2 when signal Phz<0:7> is '00100000' (crossing of threshold TH first by sample I3 and then by sample I2);

3π/4 when signal Phz<0:7> is '00010000' (crossing of threshold TH first by sample I2 and then by sample I3);

π when signal Phz<0:7> is '00001000' (crossing of threshold TH first by sample I2 and then by sample I1);

5π/4 when signal Phz<0:7> is '00000100' (crossing of threshold TH first by sample I1 and then by sample I2);

3π/2 when signal Phz<0:7> is '00000010' (crossing of threshold TH first by sample I1 and then by sample I0); and 7π/4 when signal Phz<0:7> is '00000001' (crossing of threshold TH first by sample I0 and then by sample I1).

Figure 10:
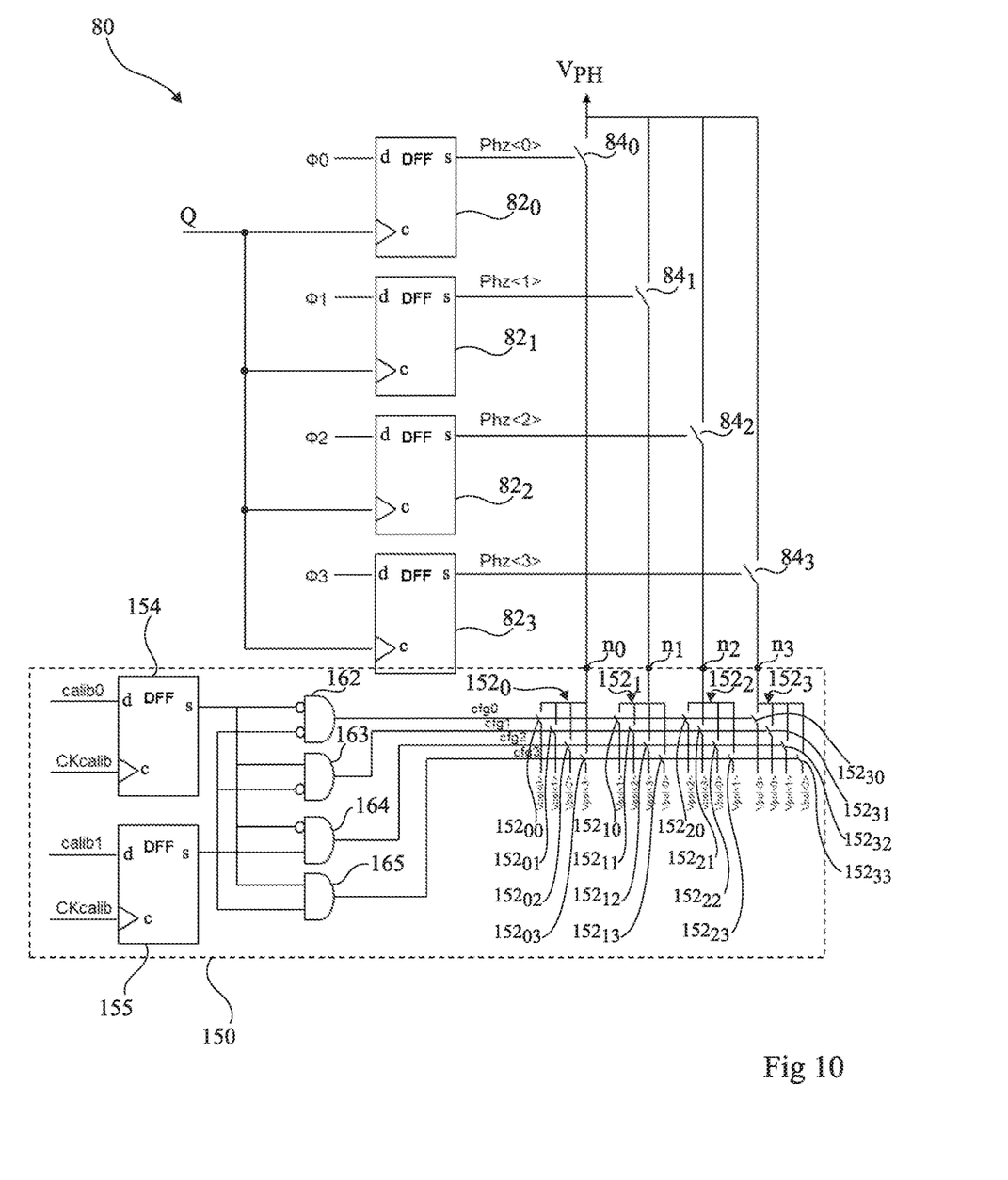
FIG. 10 is a simplified electric diagram of an alternative embodiment of a pixel of an acousto-optic imaging system.

FIG. 10 is a simplified electric diagram of an alternative embodiment of the phase detection circuit 80 of the pixel of FIG. 6. Such a variant enables, on generation of phase signal $V_{PH}$, in the case of a pixel structure of the type described in relation with FIG. 5, to compensate for possible surface unevennesses of upper glass layer 68 or for thickness variations of liquid crystal layer 62. Indeed, in a structure of the type described in relation with FIG. 5, glass layer 68 may be common to all the sensor pixels. If layer 68 is not perfectly planar, or if the layer is not arranged strictly parallel to pixel array 50, the lack of uniformity of the thickness of layer 62 may introduce different phase shifts of the reflected light beam between different pixels of the sensor for a same biasing $V_{PH}$. In the variant of FIG. 10, phase detection circuit 80 is configured to adjust voltage $V_{PH}$ according to predetermined calibration data, to compensate for phase differences due to the thickness differences of layer 68 and/or 62 between different sensor pixels.

In the example of FIG. 10, phase detection circuit 80 comprises four flip-flops 81 and one switch 84 comprising four switches $84_i$, arranged similarly to what has been described in relation with FIG. 6, with the difference that, in the example of FIG. 10, the conduction nodes of switches $84_0$, $84_1$, $84_2$, and $84_3$ are not directly connected to the nodes of application of bias voltages Vpol<0>, respectively Vpol<1>, respectively Vpol<2>, respectively Vpol<3>, but are connected to intermediate nodes $n_0$, respectively $n_1$, respectively $n_2$, respectively $n_3$.

The phase detection circuit 80 of FIG. 10 further comprises a compensation circuit 150 forming an interface between the nodes of application of bias voltages Vpol<0>, Vpol<1>, Vpol<2>, and Vpol<3> and nodes $n_0$, $n_1$, $n_2$, and $n_3$.

Compensation circuit 150 comprises four switches $152_i$, each comprising four switches $152_{ii'}$ i' being an integer in the range from 0 to 3.

Each switch $152_i$ is configured to apply to the node $n_i$ of same rank i one among the four bias voltages Vpol<0>, Vpol<1>, Vpol<2>, and Vpol<3>. More particularly, in the present example, switch $152_0$ comprises four switches $152_{00}$, $152_{01}$, $152_{02}$, $152_{03}$, each having a first conduction node coupled, for example, connected, to a node of application of bias voltage Vpol<0>, respectively Vpol<1>, respectively Vpol<2>, respectively Vpol<3>, and a second conduction node coupled, for example, connected, to node $n_0$. Switch $152_1$ comprises four switches $152_{10}$, $152_{11}$, $152_{12}$, $152_{13}$, each having a first conduction node coupled, for example, connected, to a node of application of bias voltage Vpol<1>, respectively Vpol<2>, respectively Vpol<3>, respectively Vpol<0> and a second conduction node coupled, for example, connected, to node $n_1$. Switch 1522 comprises four switches $152_{20}$, $152_{21}$, $152_{22}$, $152_{23}$, each having a first conduction node coupled, for example, connected, to a node of application of bias voltage Vpol<2>, respectively Vpol<3>, respectively Vpol<0>, respectively Vpol<1>, and a second conduction node coupled, for example, connected, to node $n_2$. Switch $152_3$ comprises four switches $152_{30}$, $152_{31}$, $152_{32}$, $152_{33}$, each having a first conduction node coupled, for example, connected, to a node of application of bias voltage Vpol<3>, respectively Vpol<0>, respectively Vpol<1>, respectively Vpol<2>, and a second conduction node coupled, for example, connected, to node $n_3$.

Switches $152_{00}$, $152_{10}$, $152_{20}$, and $152_{30}$ have their control nodes connected to a same node of application of a control signal cfg0. Switches $152_{01}$, $152_{11}$, $152_{21}$, and $152_{31}$ have their control nodes connected to a same node of application of a control signal cfg1. Switches $152_{02}$, $152_{12}$, $152_{22}$, and $152_{32}$ have their control nodes connected to a same node of application of a control signal cfg2. Switches $152_{03}$, $152_{13}$, $152_{23}$, and $152_{33}$ have their control nodes connected to a same node of application of a control signal cfg3.

Control signals cfgi are mutually exclusive, that is, a single one of the four switch assemblies {$152_{00}$, $152_{10}$, $152_{20}$, $152_{30}$}, {$152_{01}$, $152_{11}$, $152_{21}$, $152_{31}$}, {$152_{02}$, $152_{12}$, $152_{22}$, $152_{32}$}, and {$152_{03}$, $152_{13}$, $152_{23}$, $152_{33}$} may be turned on at the same time.

Control signals cfgi are generated from a digital calibration value coded over two bits, calib0 and calib1, previously determined and stored in the pixel. In this example, compensation circuit 150 comprises two D flip-flops 154 and 155. D flip-flop 154 comprises a d data input node having signal calib0 applied thereto, and a control node having a signal CKcalib for sampling the calibration value applied thereto. D flip-flop 155 comprises a d data input node having signal calib1 applied thereto, and a control node having signal CKcalib applied thereto. The compensation circuit 150 of FIG. 10 further comprises a logic circuit 160 for decoding the digital calibration value capable of generating control signals cfg0, cfg1, cfg2, and cfg3 from the binary values calib0 and calib1 stored in flip-flops 154 and 155. In this example, circuit 160 comprises four AND gates 162, 163, 164, and 165, each having two inputs and one output. AND gate 162 has two complemented inputs respectively connected to an s output node of flip-flop 154 and to an s output node of flip-flop 155. AND gate 163 has a non-complemented input and a complemented input respectively connected to an s output node of flip-flop 154 and to an s output node of flip-flop 155. AND gate 164 has a complemented input and a non-complemented input respectively connected to an s output node of flip-flop 154 and to an s output node of flip-flop 155. AND gate 165 has two non-complemented inputs respectively connected to an s output node of flip-flop 154 and to an s output node of flip-flop 155. The outputs of AND gates 162, 163, 164, and 165 respectively deliver the signals cfg0, cfg1, cfg2, and cfg3 for controlling switches $152_{ii'}$.

As a variation, instead of providing one compensation circuit 150 per pixel, the sensor pixels may be distributed into a plurality of sub-assemblies of neighboring pixels, a same compensation circuit being shared by all the pixels of a same sub-assembly and distinct compensation circuits being provided for distinct sub-assemblies.

Various embodiments and variants have been described. Those skilled in the art will understand that certain features of these various embodiments and variants may be combined, and other variants will occur to those skilled in the art. In particular, although examples of pixels and of operation based on a demodulation with K=4 phases of the modulated optical signal have been described hereabove, the described embodiments are not limited to this specific case. As a variation, the demodulation may be performed over any other number K of phases greater than or equal to 2. It will be within the abilities of those skilled in the art to accordingly adapt the pixel circuits, particularly to acquire a number of samples different from four at each modulation period $T_{US}$ of acquisition phase $T_{acq}$. The formulas of reconstruction of the real and imaginary parts of the complex field of the object beam may further be adapted accordingly. It should in particular be noted that in the case of a demodulation over more than four phases, in the same spirit as what has been described in relation with FIG. 9, the order in which threshold TH is crossed by more than two samples may be detected to generate a phase value quantized over more than three bits.

Further, although only examples of application to acousto-optic imaging, particularly in the medical field, have been described hereabove, the above-described solution of generation, within a pixel, of a signal representative of the phase of a modulated optical signal, by detection of an order in the crossing of a predetermined voltage threshold by a plurality of pixel integration capacitors, may be used in other applications. As an example, pixels of the above-described type may be used for applications of distance measurement by measurement of the time of flight of a modulated light beam or, more generally, for any application requiring a measurement of the phase of an optical signal having its intensity modulated at an acoustic frequency, for example, a frequency in the range from 20 kHz to 50 MHz.

Further, the described embodiments are not limited to the specific embodiments of the integration circuit described in relation with FIGS. 6 and 9. In these examples, the capacitors Ci of the integration circuit are discrete capacitors coupled in parallel with an operational amplifier and switched by means of switches ϕi. As a variation, the described embodiments may be adapted to a pixel architecture of the type described in document U.S. Pat. No. 10,162,048 (and in particular with FIGS. 4A to 7 of this document), incorporated herein by reference. In this case, the photodiode is a pinned photodiode. Each integration capacitor comprises a doped semiconductor region juxtaposed to the photodiodes and separated from of the photodiode by a transfer gate enabling to open or to close a potential barrier separating a charge storage region of the photodiode from said semiconductor region. Each integration capacitor is for example a pinned diode for example having a pinch-off voltage higher than that of the photodiode. The charge transfers from the photodiode to the integration capacitors are controlled via the transfer gates.

The transfer gates then replace the switches ϕi of the examples of FIGS. 6 and 9. The adaptation of the provided solution to this type of architecture is within the abilities of those skilled in the art on reading of the present disclosure. As in the examples of FIGS. 6 and 9, a charge compensation of the light offset may be provided for each switching of comparator 74. Such a compensation may be performed by means of a charge injection circuit identical or similar to the circuit 72 of FIGS. 6 and 9. As a variation, the offset compensation may be implemented by using a charge injection circuit capable of injecting a same quantity of charges into each integration capacitor, as described in the article entitled "Compact Ambient Light Cancellation Design and Optimization for 3D Time-of-Flight Image Sensors" of Yibing M. Wang et al. (2013 International Image Sensor Workshop).

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A sensor for the acquisition of an optical signal modulated at an acoustic frequency, comprising a plurality of pixels, each comprising:
   a photodiode;
   an integration circuit configured to, at each period of the modulated optical signal, integrate a photocurrent delivered by the photodiode successively into K capacitors, K being an integer greater than or equal to 2; and
   a phase detection circuit configured to detect an order in the crossing of a predetermined voltage threshold by the K capacitors and to generate, according to the detected order, a signal representative of the phase of the modulated optical signal.

2. The sensor according to claim 1, wherein in each pixel the phase detection circuit is capable of detecting the rank of the first one of the K capacitors to have crossed the voltage threshold and of assigning to the signal representative of the phase of the modulated optical signal one among K predetermined phase values according to the detected rank.

3. The sensor according to claim 1, wherein, in each pixel, the phase detection circuit is capable of detecting the rank of the first P capacitors to have crossed the voltage threshold and the order of the crossing of the voltage threshold by said P first capacitors, P being an integer greater than or equal to 2 and smaller than K, and of assigning to the modulated optical signal one among $K^P$ predetermined phase values according to the detected ranks and order.

4. The sensor according to claim 1, wherein K=4.

5. The sensor according to claim 1, wherein each pixel further comprises a charge injection circuit controlled to, at the end of each period of the modulated optical signal during which at least one of the K capacitors crosses the voltage threshold, inject a same counter-charge into each of the K capacitors of the integration circuit.

6. The sensor according to claim 1, wherein, in each pixel, at each modulation period, the photocurrent is successively integrated into the K capacitors in an order selected according to a binary signal representative of a phase jump sequence applied to a signal for modulating the optical signal.

7. The sensor according to claim 1, wherein each pixel comprises a phase control device capable of remitting a portion of the modulated light beam received by the pixel, by introducing into the reemitted light beam a phase shift which is a function of the value of the signal representative of the phase of the modulated optical signal, generated by the pixel phase detection circuit.

8. The sensor according to claim 7, wherein, in each pixel, the phase control device comprises a liquid crystal layer arranged between first and second electrodes.

9. The sensor according to claim 8, wherein, in each pixel, the first electrode of the phase control device is connected to a node for delivering the signal representative of the phase of the modulated optical signal, generated by the pixel phase detection circuit.

10. The sensor according to claim 1, wherein, in each pixel, the signal representative of the phase of the modulated optical signal is adapted, according to a calibration signal, by a compensation circuit.

11. The sensor according to claim 10, wherein each pixel comprises its own compensation circuit.

12. The sensor according to claim 10, wherein the sensor pixels are distributed into a plurality of sub-assemblies of neighboring pixels, a same compensation circuit being shared by all the pixels of a same sub-assembly and distinct compensation circuits being provided for distinct sub-assemblies.

13. The sensor according to claim 1, wherein, in each pixel, the photodiode is a pinned photodiodes, and each of the K capacitors comprises a doped conductive region juxtaposed to the photodiode, and separated from the photodiode by a transfer gate.

\* \* \* \* \*